F. F. SNYDER.
BELT SPLICE.
APPLICATION FILED NOV. 23, 1921.

1,421,036.

Patented June 27, 1922.

INVENTOR.
Frank F. Snyder,
BY
Robert D. Pearson,
ATTORNEY.

UNITED STATES PATENT OFFICE.

FRANK F. SNYDER, OF TORRANCE, CALIFORNIA.

BELT SPLICE.

1,421,036.

Specification of Letters Patent. Patented June 27, 1922.

Application filed November 23, 1921. Serial No. 517,324.

*To all whom it may concern:*

Be it known that I, FRANK F. SNYDER, a citizen of the United States, residing at Torrance, in the county of Los Angeles and State of California, have invented certain new and useful Improvements in a Belt Splice, of which the following is a specification.

My invention relates to improvements in a double ply belt-splice for power transmission machinery, and the objects of my improvements are, first, to provide an unbroken running surface in power transmission belts of any material, to obtain a smooth and endless traction surface on pulleys or other flat surfaces, second; to provide a splice that will make a permanent and strong joint, by a simple plate and rivet means, third; in a splice that may be applied through the belt that will furnish the maximum of power transmission without breaking or tearing the holes or slits therein.

A further object of my invention is to provide a belt-splice that will conform to all the requirements of safety rules and regulations.

A still further object of my invention is to provide a belt-splice that will give an equal tension on all parts of the joint, to eliminate tearing or ultimately wasting the belt.

A still further object of my invention is to provide a belt-splice that may be used with a low cost, simple to install, and inexpensive to maintain.

I attain these objects by the joint illustrated in the accompanying drawing, in which—

Figure 1:
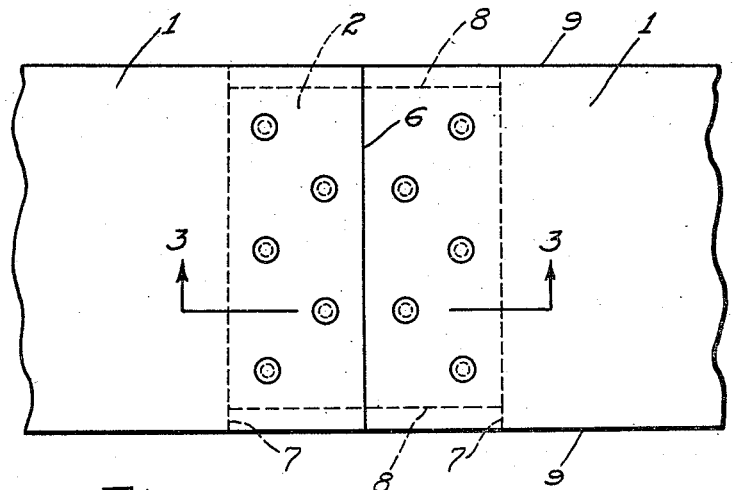
Figure 2:
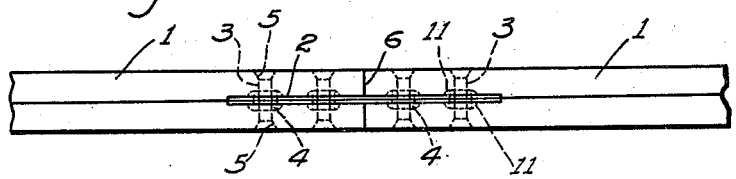
Figure 3:
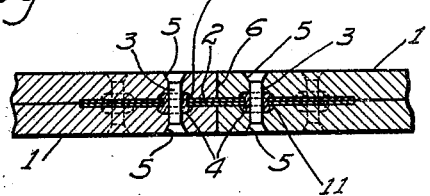

Figure 1 represents a plan view of the belt-splice; Fig. 2, a side view of the belt-splice; and Fig. 3, a sectional view on line 3—3 of Fig. 1.

Similar numerals refer to similar parts throughout the several views.

The two ends of the double ply belt 1 are positioned squarely together at the joint 6, the slits 7 are cut in the central-end portions of the belt 1, between the plies thereof, from the joint 6 and extending back a sufficient distance to receive a plate 2, the said plate 2 is positioned in the two slits 7 with an equal depth from the said joint 6, with the sides 8 on the plate 2 standing back of the sides 9 on the belt 1. The eyelets 4 are positioned in the plate 2, and the pins 3 are in turn positioned through the belt 1 and the eyelets 4, the shoulders 11 are integral with the said eyelets 4 and are positioned on both ends thereof, over the said plate 2, and the heads 5 are also integral with the said pins 3 and are positioned on the two ends thereof, flush with the outside faces of the belt 1.

To splice a belt with a plate 2, pins 3 and eyelets 4, the two ends of the belt 1 form the joint 6 which is cut perfectly square, the slits 7 are then cut into the two ends of the belt 1, to accommodate one half of the plate 2 in each of the said ends. The eyelets 4 are pressed into the plate 2 in number and location to suit the requirements, and the shoulders 11 are then formed on the two ends of the said eyelets 4 over the said plate 2. The two ends of the belt 1 are punched with holes to correspond with the number and location of the eyelets 4 in the plate 2, the plate 2 may then be placed into position in the slits 7, with the shoulders 11 pressing into the punched holes in the said belt 1, the pins 3 are then forced through the said punched holes in the belt 1, and through the eyelets 4, and the entire assembly is then pressed into a solid joint by riveting the ends of the pins 3 back into the belt 1 to form the heads 5, flush with the outer faces thereof, to make an even and unbroken running surface on all four sides of the said belt-splice, and a continuous traction surface, with no clearance requirements other than the actual thickness or width of the said belt 1.

A belt with my improved belt-splice can be shifted from one pulley to the other with no danger to the operator due to surplus material extending beyond the thickness or width of the belt, and will run practically endless with no pounding or vibration whatsoever, particularly over idler pulleys.

Having thus described my invention what I claim is:

1. In a belt of the class described, a belt-splice with two fitted ends joined together, in combination with a plate spliced between the two ends of the said belt, pins positioned through the said two fitted ends of the belt and the plate, riveted heads integral with both outer ends of the said pins flush with the outer surface of the belt, eyelets positioned in the said plate and extending into the said belt-splice adapted to receive the said pins, as set forth.

2. In a double ply belt of the class described, a belt-splice with two fitted ends joined together, in combination with laminated plates positioned between the plies of the said splice, eyelets positioned in the said laminated plates, shoulders on the two ends of the said eyelets, adapted to hold the said laminated plates together, pins positioned through the ends of the said belt and the said eyelets, riveted heads integral with the two other ends of the said pins, adapted to lie flush with the outer surface of the belt, as set forth.

In testimony whereof I affix my signature.

FRANK F. SNYDER.